(12) United States Patent
Hasegawa et al.

(10) Patent No.: US 10,924,653 B2
(45) Date of Patent: Feb. 16, 2021

(54) IMAGING APPARATUS, CONTROL METHOD AND NON-TRANSITORY COMPUTER READABLE MEDIUM

(71) Applicant: FUJIFILM Corporation, Tokyo (JP)

(72) Inventors: Yuji Hasegawa, Saitama (JP); Satoru Wakabayashi, Saitama (JP); Shunta Ego, Saitama (JP); Tomoyuki Mizuta, Saitama (JP); Yukinori Nishiyama, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/543,166

(22) Filed: Aug. 16, 2019

(65) Prior Publication Data

US 2019/0373161 A1 Dec. 5, 2019

Related U.S. Application Data

(63) Continuation of application No. PCT/JP2018/004074, filed on Feb. 6, 2018.

(30) Foreign Application Priority Data

Feb. 17, 2017 (JP) .................. 2017-027824

(51) Int. Cl.
*H04N 5/232* (2006.01)
*G03B 17/02* (2006.01)
*H04N 5/225* (2006.01)

(52) U.S. Cl.
CPC ......... *H04N 5/23203* (2013.01); *G03B 17/02* (2013.01); *H04N 5/2251* (2013.01); *H04N 5/232933* (2018.08)

(58) Field of Classification Search
CPC ......... H04N 5/23203; H04N 5/232933; H04N 5/2251; G03B 17/02; G03B 7/01; G03B 7/003
See application file for complete search history.

(56) References Cited

U.S. PATENT DOCUMENTS 8,564,709 B2 * 10/2013 Inoue ................. H04N 5/23216
348/333.02
8,810,715 B1 * 8/2014 Rudin .................. H04N 5/2351
348/362

(Continued)

FOREIGN PATENT DOCUMENTS

| CN | 1691751 A | 11/2005 |
|----|-----------|---------|
| CN | 1691754 A | 11/2005 |

(Continued)

OTHER PUBLICATIONS

International Preliminary Report on Patentability and Written Opinion of the International Searching Authority(Forms PCT/IB/326, PCT/IB/373 and PCT/ISA/237), dated Aug. 29, 2019, for International Application No. PCT/JP2018/004074, with an English Translation.

(Continued)

*Primary Examiner* — Lin Ye
*Assistant Examiner* — John H Morehead, III
(74) *Attorney, Agent, or Firm* — Birch, Stewart, Kolasch & Birch, LLP

(57) ABSTRACT

In a case where a user sets an imaging condition setting rule based on a setting menu (M), a setting item of the imaging condition setting rule is selected from among a plurality of setting items. In a case where the setting item of the imaging condition setting rule is selected, a selection candidate list of an imaging condition setting rule having selection candidates "ALL FIRST-WIN", "ALL LATE-WIN", and "MIXED" is displayed. In a case where "ALL FIRST-WIN"

(Continued)

is selected, a first-win processing unit is executed in all combinations of two setting items. In a case where "ALL LATE-WIN" is selected, a late-win processing unit is executed in all combinations of two setting items. Then, in a case where "MIXED" is selected, a mixed state is brought in which a combination, in which the first-win processing unit is executed, and a combination, in which the late-win processing unit is executed, are mixed.

10 Claims, 15 Drawing Sheets

(56) References Cited

U.S. PATENT DOCUMENTS

| | | | |
|---|---|---|---|
| 2005/0212922 A1 | 9/2005 | Watanabe | |
| 2005/0237411 A1 | 10/2005 | Watanabe | |
| 2008/0070623 A1 | 3/2008 | Ogawa | |
| 2009/0268024 A1* | 10/2009 | Tsukuda | H04N 5/77 |
| | | | 348/143 |
| 2013/0083219 A1* | 4/2013 | Heo | H04N 5/262 |
| | | | 348/231.6 |
| 2014/0240531 A1 | 8/2014 | Nakai et al. | |
| 2014/0281966 A1* | 9/2014 | Kajiyama | H04N 5/232939 |
| | | | 715/708 |
| 2015/0350504 A1* | 12/2015 | Corcoran | H04N 5/232122 |
| | | | 348/211.99 |
| 2016/0191800 A1* | 6/2016 | Yoshikawa | H04N 5/23293 |
| | | | 348/220.1 |

FOREIGN PATENT DOCUMENTS

| | | |
|---|---|---|
| CN | 101141569 A | 3/2008 |
| CN | 101150668 A | 3/2008 |
| CN | 101355651 A | 1/2009 |
| CN | 104023174 A | 9/2014 |
| JP | 2002-156675 A | 5/2002 |
| JP | 2013-31205 A | 5/2002 |
| JP | 2005-192112 A | 7/2005 |
| JP | 2006-47706 A | 2/2006 |
| JP | 2007-243418 A | 9/2007 |
| JP | 2012-235393 A | 11/2012 |

OTHER PUBLICATIONS

International Search Report, dated Apr. 3, 2018, for International Application No. PCT/JP2018/004074, with an English translation.
Chinese Office Action and Search Report for corresponding Chinese Application No. 201880012328.1, dated Jul. 30, 2020, with English translation of the Office Action.

* cited by examiner

| DYNAMIC RANGE SETTING | ISO SENSITIVITY | | | | | | | | | | | |
|---|---|---|---|---|---|---|---|---|---|---|---|---|
| | 100 | 200 | 400 | 640 | 800 | 1000 | 1250 | 1600 | 2000 | 2500 | 3200 |
| 100 | OK | OK | OK | OK | OK | OK | OK | OK | OK | OK | OK |
| 200 | NG | NG | OK | OK | OK | OK | OK | OK | OK | OK | OK |
| 400 | NG | NG | NG | NG | OK | OK | OK | OK | OK | OK | OK |

| SETTING MENU | |
|---|---|
| IMAGING CONDITION SETTING RULE | MIXED |
| FOCUS MODE | MF |
| ISO SENSITIVITY | 400 |
| DYNAMIC RANGE SETTING | 100 |
| FACE DETECTION | ON |

NEXT PAGE

FIG. 6

| IMAGING CONDITION SETTING RULE | ALL FIRST-WIN |
|---|---|
| | ALL LATE-WIN |
| | MIXED |

RETURN          OK

FIG. 7

| FOCUS MODE | MF |
| --- | --- |
|  | S-AF |
|  | C-AF |

| RETURN | OK |

FIG. 8

| ISO SENSITIVITY | 100 |
| --- | --- |
|  | 200 |
|  | 400 |
|  | 640 |
|  | 800 |
|  | 1000 |
|  | 1250 |
|  | 1600 |
|  | 2000 |
|  | 2500 |
|  | 3200 |

| RETURN | OK |

FIG. 9

| DYNAMIC RANGE SETTING | 100 |
| --- | --- |
| | 200 |
| | 400 |

RETURN　　　　OK

FIG. 10

| FACE DETECTION | ON |
| --- | --- |
| | OFF |

RETURN　　　　OK

M → SETTING MENU

| IMAGING CONDITION SETTING RULE | ALL FIRST-WIN |
|---|---|
| FOCUS MODE | S-AF |
| ISO SENSITIVITY | 800 |
| DYNAMIC RANGE SETTING | 100 |
| FACE DETECTION | ON |

NEXT PAGE

M → SETTING MENU

| IMAGING CONDITION SETTING RULE | ALL FIRST-WIN |
|---|---|
| FOCUS MODE | S-AF |
| ISO SENSITIVITY | 100 |
| DYNAMIC RANGE SETTING | 100 |
| FACE DETECTION | ON |

NEXT PAGE

| IMAGING CONDITION SETTING RULE | ALL LATE-WIN |
|---|---|
| FOCUS MODE | S-AF |
| ISO SENSITIVITY | 100 |
| DYNAMIC RANGE SETTING | 100 |
| FACE DETECTION | ON |

NEXT PAGE

M

SETTING MENU

| IMAGING CONDITION SETTING RULE | ALL LATE-WIN |
|---|---|
| FOCUS MODE | S-AF |
| ISO SENSITIVITY | 800 |
| DYNAMIC RANGE SETTING | 400 |
| FACE DETECTION | ON |

NEXT PAGE ( ! ) ISO SENSITIVITY 100 → 800

FIG. 17
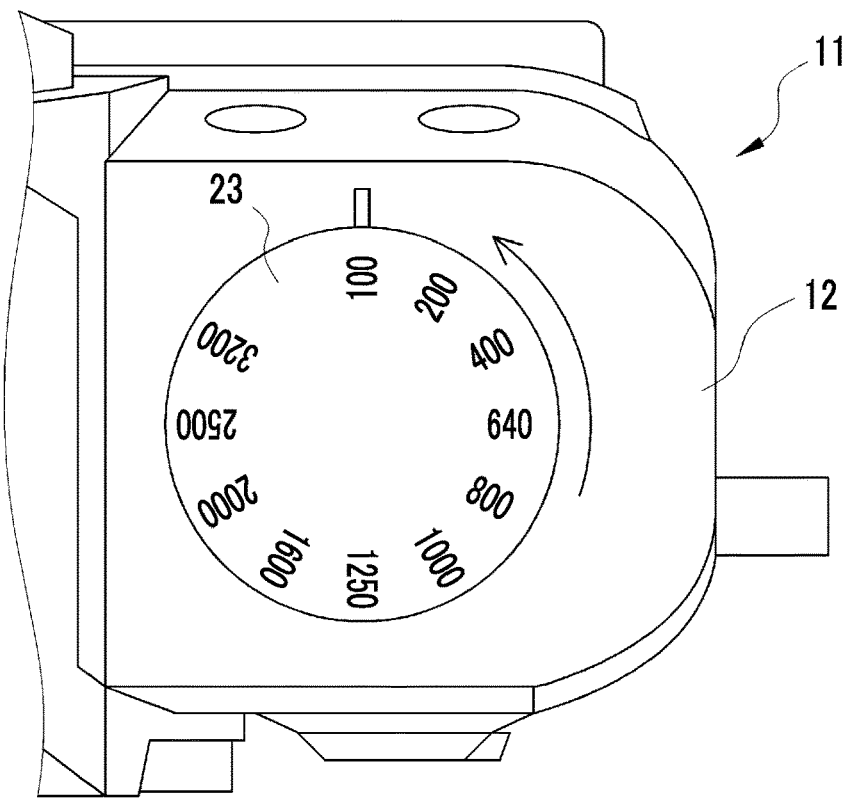
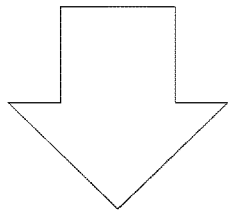
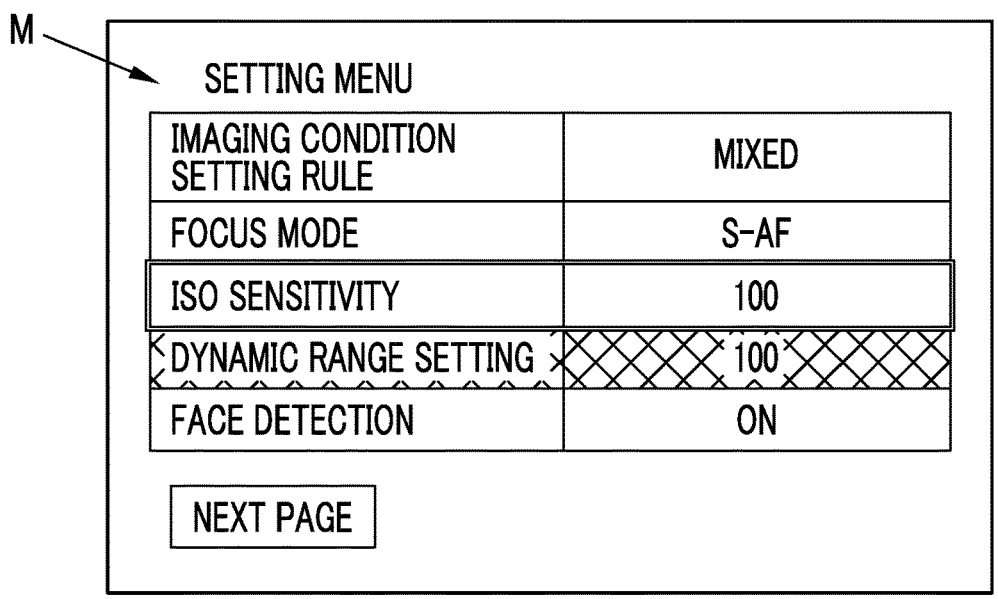

FIG. 18

| PRIORITY | SETTING ITEM | | |
|---|---|---|---|
| 1 | FOCUS MODE | ↑ | ↓ |
| 2 | ISO SENSITIVITY | ↑ | ↓ |
| 3 | DYNAMIC RANGE SETTING | ↑ | ↓ |
| 4 | FACE DETECTION | ↑ | ↓ |
| ⋮ | ⋮ | | |

RETURN    OK

FIG. 19
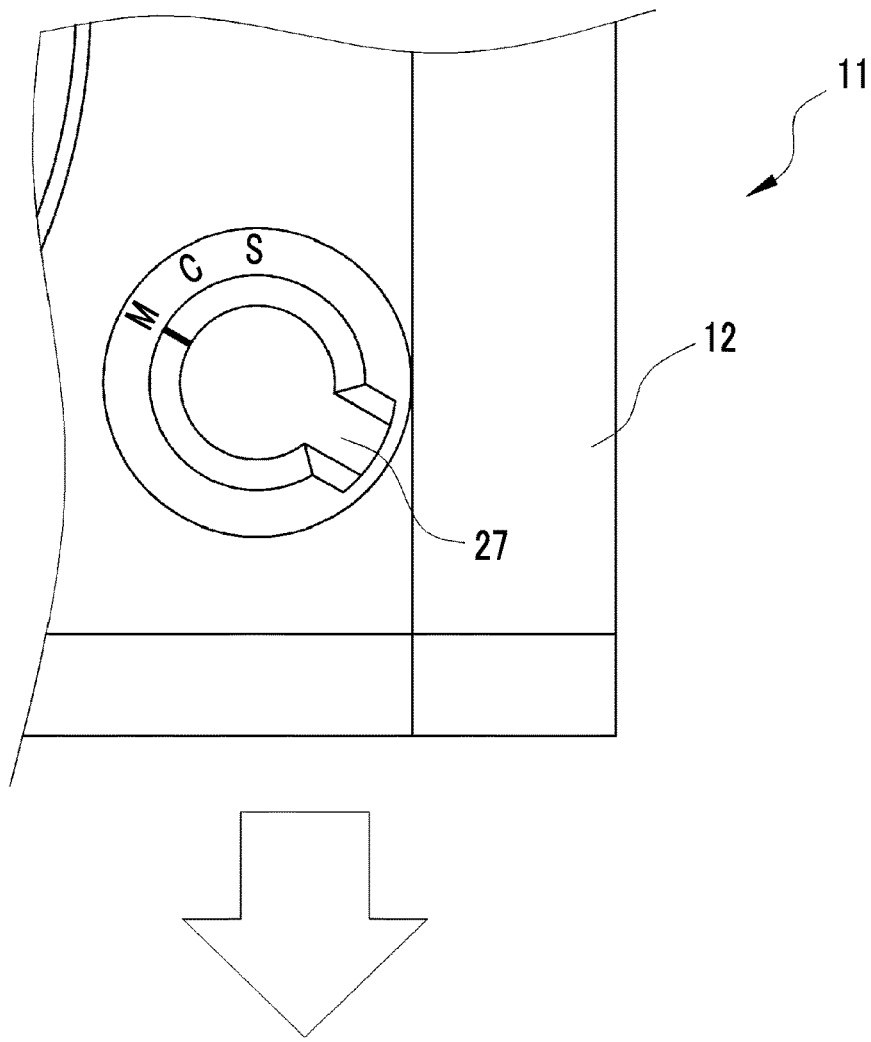
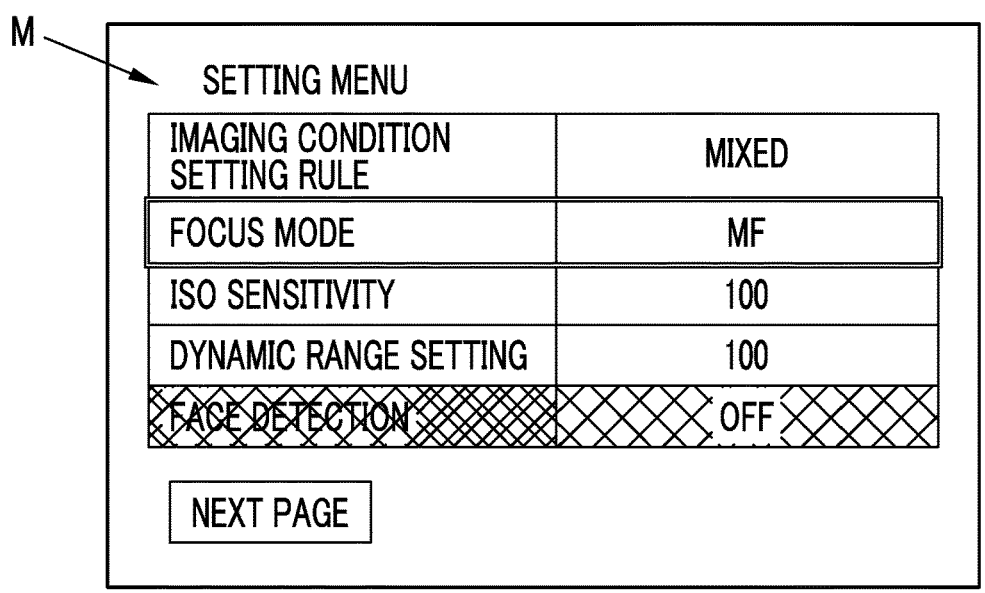

IMAGING APPARATUS, CONTROL METHOD AND NON-TRANSITORY COMPUTER READABLE MEDIUM

CROSS-REFERENCE TO RELATED APPLICATIONS

This application is a Continuation of PCT International Application No. PCT/JP2018/004074 filed on 6 Feb. 2018, which claims priority under 35 U.S.C § 119(a) to Japanese Patent Application No. 2017-027824 filed on 17 Feb. 2017. The above application is hereby expressly incorporated by reference, in its entirety, into the present application.

BACKGROUND OF THE INVENTION

1. Field of the Invention

The present invention relates to an imaging apparatus, a control method and a non-transitory computer readable medium.

2. Description of the Related Art

Among imaging apparatuses, such as a digital camera, an imaging apparatus that can set setting items of various imaging conditions to capture high-quality images is known. In such an imaging apparatus, in general, setting information that cannot be set simultaneously and is in a so-called exclusive relationship in a plurality of setting items.

In an imaging apparatus in which there is the setting information in the exclusive relationship described above, for example, there are a case where first-win processing for prohibiting a second setting item from being set to second setting information in an exclusive relationship after a first setting item is set to first setting information is executed, and a case where late-win processing for changing the first setting information to setting information not in the exclusive relationship in a case where the second setting item is set to the second setting information in the exclusive relationship after the first setting item is set to the first setting information is executed. In general, a case where the first-win processing is executed and a case where the late-win processing is executed are mixed depending on a combination of setting items.

A digital camera described in JP2012-235393A acquires imaging conditions from accessory information attached to one reference image selected from a plurality of reference images, and sets setting information of respective setting items using the acquired imaging conditions. Furthermore, the digital camera has a function of prohibiting the setting information of any setting item selected by the user among the acquired imaging conditions from being changed. That is, first-win processing can be executed for the setting item selected by the user.

SUMMARY OF THE INVENTION

However, the first-win processing and the late-win processing described above have advantages and disadvantages. That is, in the first-win processing, while the setting information as intended by the user is set for the first setting item set ahead, the setting information in the exclusive relationship is prohibited from being set for the second setting item to be set later. For this reason, the setting information intended by the user may not be set. On the other hand, in the late-win processing, while the second setting item can be set as intended by the user after the first setting item is set to the first setting information, for the first setting item, the setting information may be changed to setting information not intended by the user.

As a setting method of the imaging conditions, some users desire to leave the setting information of the setting item set ahead, and other users desire to freely change the setting information of the setting item to be set later. That is, some users are suited to the first-win processing, and other users are suited to the late-win processing. For this reason, it is desirable that the first-win processing or the late-win processing is selectable depending on the preference of the user. In the digital camera described in JP2012-235393A described above, for the setting item selected by the user, while the first-win processing can be selected, the late-win processing cannot be selected.

An object of the invention is to provide an imaging apparatus capable of allowing a user to properly use first-win processing and late-win processing for setting items in an exclusive relationship, and a control method a non-transitory computer readable medium.

In order to achieve the above-described object, the invention provides an imaging apparatus comprising an imager, a processor, and a setting operation member. The imager captures a subject image. The processor sets one piece of setting information from among a plurality of pieces of setting information in the imager for each of a plurality of setting items relating to imaging conditions of the imager. The processor defines a combination of setting information prohibited from being simultaneously set as an exclusive relationship for a first setting item and a second setting item included in the plurality of setting items. The processor performs a first-win processing that prohibits the second setting item from being set to second setting information in the exclusive relationship after the first setting item is set to first setting information. The processor performs a late-win processing that changes the first setting information to setting information not in the exclusive relationship in a case where the second setting item is set to the second setting information in the exclusive relationship after the first setting item is set to the first setting information. The setting operation member enables selective setting of which of the first-win processing and the late-win processing is to be executed for a relationship between two setting items included in the plurality of setting items.

It is preferable that the setting operation member enables selective setting of an all first-win state in which the processor is executed to perform first-win processing in all combinations of two setting items included in the plurality of setting items, an all late-win state in which the processor is executed to perform late-win processing in all combinations of two setting items included in the plurality of setting items, and a mixed state in which, among all combinations of two setting items included in the plurality of setting items, a combination, in which the processor is executed to perform first-win processing, and a combination, in which the processor is executed to perform late-win processing, are mixed.

It is preferable that the imaging apparatus further comprises a display that displays a setting menu for enabling setting of setting information of any one of the first setting item and the second setting item, and the setting operation member includes a first operation member that enables setting of the setting information of any one of the first setting item and the second setting item in a case where the setting menu is displayed on the display.

It is preferable that the setting operation member includes a second operation member different from the first operation member, and in a case where a setting item, for which setting information is set by the second operation member, and a setting item, for which setting information is set by the first operation member, have the exclusive relationship defined by the processor, and the mixed state is set by the setting operation member, the processor prohibits the second setting item from being set to the second setting information in the exclusive relationship by the first operation member after the first setting item is set to the first setting information by the second operation member, and the processor changes the first setting information to the setting information not in the exclusive relationship in a case where the second setting item is set to the second setting information in the exclusive relationship by the second operation member after the first setting item is set to the first setting information by the first operation member.

It is preferable that the second operation member comprises an operator that is provided in an apparatus body, and a detector that detects positional information of the operator, and sets setting information based on the positional information of the operator detected by the detector.

It is preferable that the processor, in a case where the first setting information is changed to the setting information not in the exclusive relationship with the second setting information by the late-win processing, and the setting information based on the positional information of the operator is different from the first setting information, issues a warning that the setting information is changed.

It is preferable that the setting menu includes a selection menu for selecting the all first-win state, the all late-win state, and the mixed state, and the setting operation member enables setting of any one of the all first-win state, the all late-win state, and the mixed state in a case where the selection menu is displayed on the display.

It is preferable that the processor decides priority for the plurality of setting items in a case where the mixed state is selected by the setting operation member, prohibits the second setting item with priority lower than the first setting item from being set to setting information in the exclusive relationship after the first setting item is set to the first setting information, and changes the first setting information to the setting information not in the exclusive relationship in a case where the second setting item with priority higher than the first setting item is set to the second setting information in the exclusive relationship after the first setting item is set to the first setting information.

The invention also provides a control method for an imaging apparatus comprising a step of defining a combination of setting information prohibited from being simultaneously set as an exclusive relationship for a first setting item and a second setting item included in a plurality of setting items relating to imaging condition of an imager, a step of selectively setting execution of first-win processing or late-win processing for the relationship between two setting items included in the plurality of setting items, a step of prohibiting the second setting item from being set to second setting information in the exclusive relationship after the first setting item is set to first setting information in a case where the first-win processing is set for the relationship between two setting items included in the plurality of setting items, and a step of changing the first setting information to setting information not in the exclusive relationship in a case where the late-win processing is set for the relationship between two setting items included in the plurality of setting items, and in a case where the second setting item is set to the second setting information in the exclusive relationship after the first setting item is set to the first setting information.

The invention also provides a non-transitory computer readable medium for storing a computer-executable program for controlling an imaging apparatus. The computer-executable program causes the computer to execute a function of defining a combination of setting information prohibited from being simultaneously set as an exclusive relationship for a first setting item and a second setting item included in a plurality of setting items relating to imaging condition of an imager, a function of selectively setting execution of first-win processing or late-win processing for the relationship between two setting items included in the plurality of setting items, a function of prohibiting the second setting item from being set to second setting information in the exclusive relationship after the first setting item is set to first setting information in a case where the first-win processing is set for the relationship between two setting items included in the plurality of setting items, and a function of changing the first setting information to setting information not in the exclusive relationship in a case where the late-win processing is set for the relationship between two setting items included in the plurality of setting items, and in a case where the second setting item is set to the second setting information in the exclusive relationship after the first setting item is set to the first setting information.

According to the invention, it is possible to allow a user to properly use first-win processing and late-win processing for setting items in an exclusive relationship.

BRIEF DESCRIPTION OF THE DRAWINGS

FIG. 4 is an explanatory view showing an example of an exclusive relationship setting table.

FIG. 5 is an explanatory view of a setting screen showing an example of a setting menu.

FIG. 6 is an explanatory view of a setting screen showing a selection candidate list in a case where a setting item of an imaging condition setting rule is selected in the setting menu.

FIG. 7 is an explanatory view of a setting screen showing a selection candidate list in a case where a setting item of a focus mode is selected in the setting menu.

FIG. 8 is an explanatory view of a setting screen showing a selection candidate list in a case where a setting item of ISO sensitivity is selected in the setting menu.

FIG. 9 is an explanatory view of a setting screen showing a selection candidate list in a case where a setting item of dynamic range setting is selected in the setting menu.

FIG. 10 is an explanatory view of a setting screen showing a selection candidate list in a case where a setting item of face detection is selected in the setting menu.

FIG. 17 is an explanatory view showing an example of a setting screen on which the setting information of the dynamic range setting is prohibited from being set to setting information in the exclusive relationship with the setting information of the ISO sensitivity after the ISO sensitivity is set by an external key.

FIG. 18 is an explanatory view showing an example of a priority decision screen on which priority of imaging conditions in a second embodiment is decided.

FIG. 19 is an explanatory view showing an example of a setting screen on which setting information of the face detection is prohibited from being set to setting information in the exclusive relationship with setting information of the focus mode after the focus mode is set by the external key in a third embodiment.

DESCRIPTION OF THE PREFERRED EMBODIMENTS

First Embodiment

Figure 1:
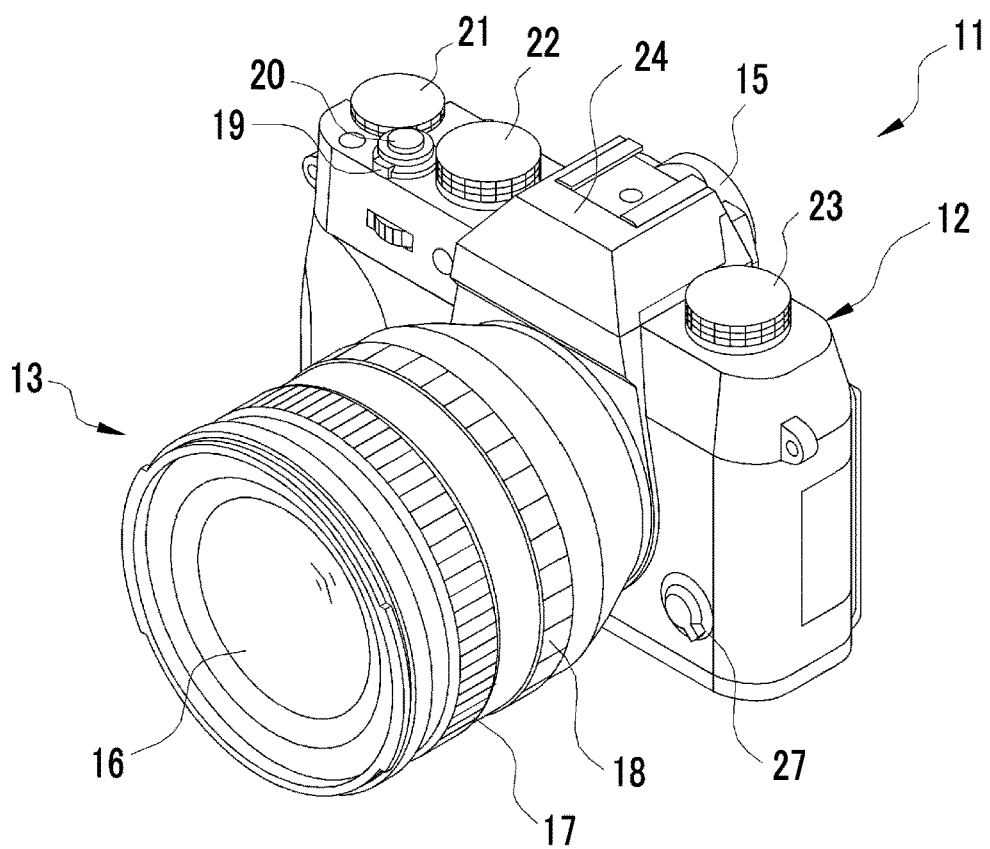
FIG. 1 is a perspective view showing an appearance of a digital camera from a front side.
Figure 2:
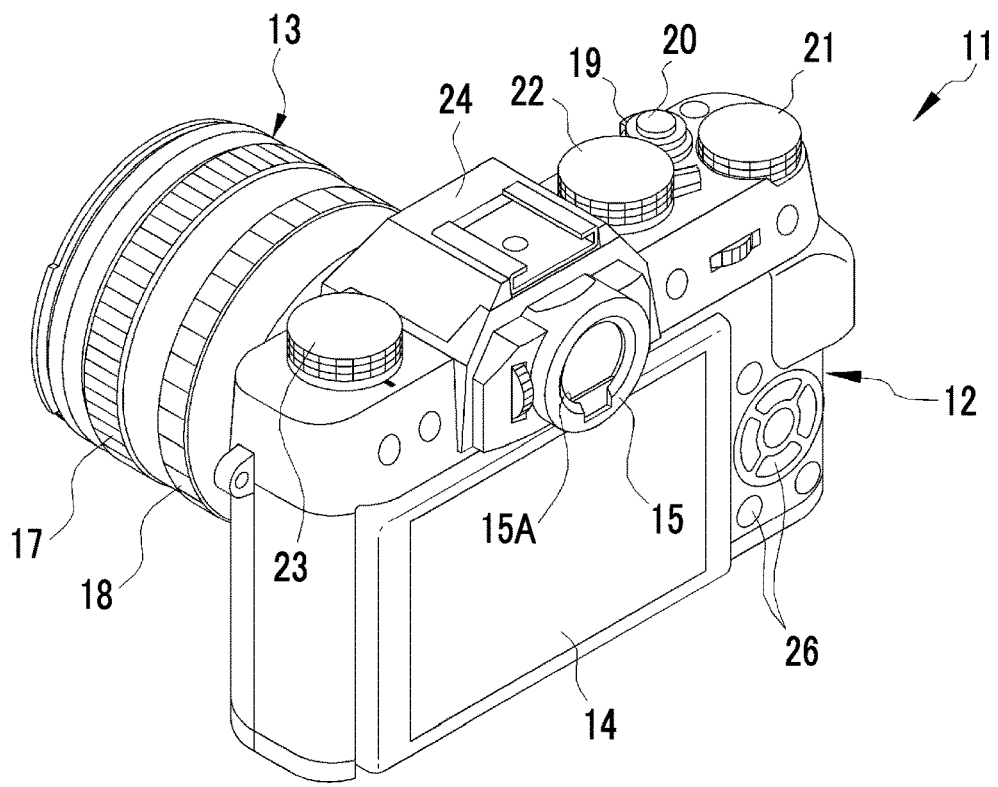
FIG. 2 is a perspective view showing the appearance of the digital camera from a rear side.

In FIGS. 1 and 2, a digital camera 11 comprises a camera body 12 (apparatus body), a lens barrel 13, a rear display unit 14, and a finder unit 15.

The lens barrel 13 is provided on a front surface of the camera body 12, and holds an imaging optical system 16. A focus ring 17 and a stop ring 18 are provided rotatably on an outer periphery of the lens barrel 13. The focus ring 17 and the stop ring 18 are manually rotated by a photographer, thereby performing focus adjustment and stop adjustment of the imaging optical system 16.

The rear display unit 14 is provided on a rear surface of the camera body 12 and is used for display of a live view image, reproduction of a captured image, display of a setting menu, and the like. The rear display unit 14 is constituted of, for example, an LCD panel. A touch panel 29 (see FIG. 3) is attached to a surface of the rear display unit 14, and an input instruction from the touch panel 29 is transmitted to a main control unit 41.

A power lever 19, a release switch 20, an exposure correction dial 21, a shutter speed dial 22, an ISO sensitivity dial 23, an internal flash device 24 (hereinafter, referred to as a flash device), and the like are provided on an upper surface of the camera body 12. A plurality of operation buttons 26 are provided on the rear surface of the camera body 12. A plurality of operation buttons 26 are used for various setting operations and the like. On a front surface of the camera body 12, a focus mode switch lever 27 is provided.

Hereinafter, the exposure correction dial 21, the shutter speed dial 22, the ISO sensitivity dial 23, the focus mode switch lever 27, and the like are collectively referred to as external keys. The external keys correspond to a second operation unit in the claims, and are an operation unit different from a first operation unit described below. Each of the external keys comprises an operation member that is provided in the camera body 12, and a detection unit that detects positional information of the operation member, and can set setting information based on the positional information of the operation member detected by the detection unit. In the embodiment, all of the operation members constituting the external keys are rotary dials, and setting information can be set based on the rotation positions of the dials detected by the detection units (not shown).

The power lever 19 is operated in turning on/off a power source (not shown) of the digital camera 11. The release switch 20 is operated in executing imaging. The shutter speed dial 22 is operated in switching a shutter speed of the digital camera 11.

The release switch 20 has a two-stage stroke type switch (not shown) constituted of an S1 switch and an S2 switch. The digital camera 11 performs an imaging preparation operation, such as automatic exposure adjustment, in a case where the release switch 20 is depressed (half depression) and the S1 switch is brought into an on state. In a case where the release switch 20 is further depressed (full depression) from this state and the S2 switch is brought into an on state, an imaging operation is performed.

In a bottom portion of the camera body 12, a slot (not shown) for mounting a recording medium 51 (see FIG. 3) described below and a loading lid (not shown) for opening and closing an aperture of the slot are provided.

The finder unit 15 is an electronic view finder, and a live view image as a subject image captured by the imaging element 34 (see FIG. 3) is displayed on an in-finder display unit 28 (see FIG. 3) constituted of an LCD disposed at the back of a finder objective window 15A. An eye of a photographer contacts the finder objective window 15A disposed on the rear surface side of the camera body 12.

Figure 3:
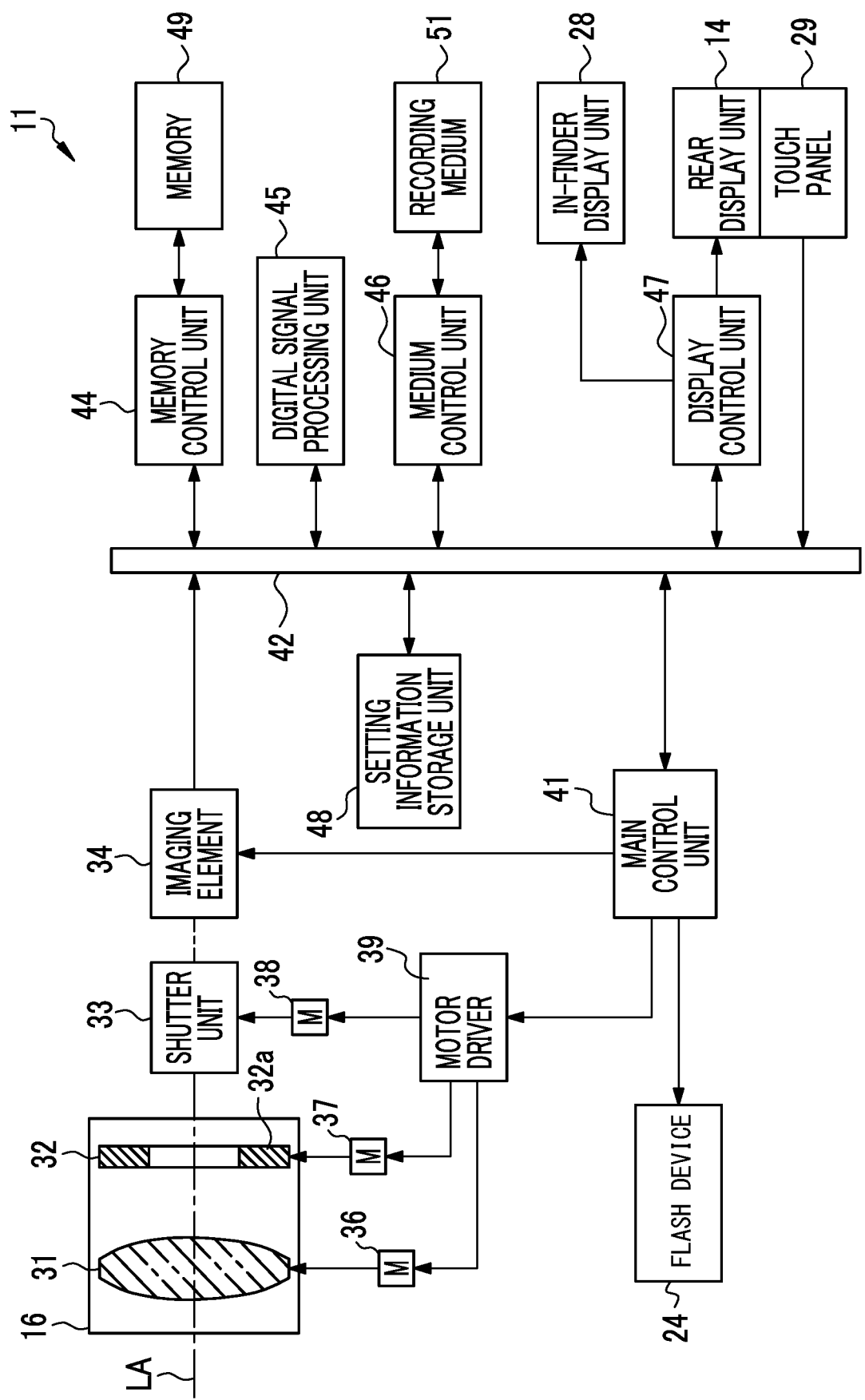
FIG. 3 is a block diagram showing the configuration of the digital camera.

In FIG. 3, the imaging optical system 16 comprises a plurality of lenses including a focus lens 31, a stop unit 32, and the like. A shutter unit 33 and an imaging element 34 are disposed behind the imaging optical system 16 along an optical axis LA of the imaging optical system 16. The imaging element 34 is provided inside the camera body 12.

The focus lens 31 is moved in a direction of the optical axis LA with driving of a motor 36 and adjusts an imaging distance. The main control unit 41 transmits a control signal for moving the focus lens 31 to a motor driver 39 according to a rotation direction and an amount of rotation of the focus ring 17 detected based on a signal of a detection unit (not shown). The motor driver 39 drives the motor 36 based on the control signal.

The stop unit 32 moves a plurality of stop leaf blades 32a with driving of a motor 37 and changes an amount of light incident on the imaging element 34. The optical image of the subject that is transmitted through the imaging optical system 16 and has an amount of light adjusted by a stop 30 is incident on the imaging element 34. The main control unit 41 transmits a control signal for moving the stop leaf blades 32a to the motor driver 39 according to an angle position of the stop ring 18 detected based on a signal of a detection unit (not shown). The motor driver 39 drives the motor 37 based on the control signal.

The shutter unit 33 is a mechanical shutter, such as a focal plane shutter, and is disposed between the stop unit 32 and the imaging element 34. The shutter unit 33 is provided to shut off an optical path between the imaging optical system 16 and the imaging element 34, and changes between an aperture open state and an aperture closed state.

The shutter unit 33 is brought into the aperture open state at the time of live view image and video imaging. The shutter unit 33 is temporarily brought into the aperture closed state from the aperture open state at the time of static image capturing. The shutter unit 33 is driven by a motor 38. The main control unit 41 transmits a control signal for operating the shutter unit 33 to the motor driver 39 according to setting information of a shutter system described below. The motor driver 39 drives the motor 38 based on the control signal.

The imaging element 34 is driven and controlled by the main control unit 41. The imaging element 34 constitutes an imaging unit along with the shutter unit 33, the digital signal processing unit 45, and the like. In a case of flash imaging using the flash device 24, the flash device 24 also constitutes the imaging unit. The imaging element 34 is, for example, a single-plate color imaging type CMOS image sensor having an RGB color filter. The imaging element 34 has a light receiving surface constituted of a plurality of pixels (not shown) arranged in a two-dimensional matrix. Each pixel includes a photoelectric conversion element, and captures the subject image formed on the light receiving surface by the imaging optical system 16 through photoelectric conversion to generate an imaging signal. The imaging element 34 has an electronic shutter function, and a shutter speed (electric charge accumulation time) thereof can be adjusted.

The imaging element 34 comprises signal processing circuits (all are not shown), such as a noise elimination circuit, an automatic gain controller, and an A/D conversion circuit. The noise elimination circuit executes noise elimination processing on the imaging signal. The automatic gain controller amplifies the level of the imaging signal to an optimum value. The A/D conversion circuit converts the imaging signal to a digital signal and outputs the digital signal from the imaging element 34. An output signal of the imaging element 34 is image data (so-called RAW data) having one pixel value for each pixel.

The imaging element 34 and the main control unit 41 are connected to a bus 42. In addition, a memory control unit 44, a digital signal processing unit 45, a medium control unit 46, a display control unit 47, a setting information storage unit 48, and the touch panel 29 are connected to the bus 42.

A memory 49 for temporary storage, such as an SDRAM, is connected to the memory control unit 44. The memory control unit 44 inputs and stores image data output from the imaging element 34 to the memory 49. The memory control unit 44 outputs image data stored in the memory 49 to the digital signal processing unit 45.

The digital signal processing unit 45 executes known image processing, such as matrix calculation, demosaic processing, γ correction, brightness and color difference conversion, and resizing processing, on image data input from the memory 49, and generates a subject image based on the pixel value of each pixel.

The medium control unit 46 controls recording and reading of image files on and from a recording medium 51. The recording medium 51 is, for example, a memory card embedded with a flash memory. The medium control unit 46 records image data compressed by the digital signal processing unit 45 on the recording medium 51.

The display control unit 47 controls image display on the rear display unit 14 and the in-finder display unit 28. Specifically, the display control unit 47 generates a video signal according to the NTSC standard or the like based on image data generated by the digital signal processing unit 45 and outputs the video signal to the rear display unit 14 and the in-finder display unit 28.

In a case where a setting mode is selected by an operation of the operation button 26, the main control unit 41 drives and controls the display control unit 47 to make the rear display unit 14 display the setting menu. The setting menu enables setting of setting items relating to imaging conditions of the imaging unit of the digital camera 11, and enables setting of an imaging condition setting rule described below. In the setting menu, a setting item of the imaging condition setting rule and a plurality of setting items relating to the imaging conditions of the imaging unit are displayed.

In a case where the setting mode is selected, the main control unit 41 functions as a setting unit that sets one piece of setting information from a plurality of pieces of setting information in the imaging unit for each of a plurality of setting items relating to the imaging conditions of the imaging unit by an operation of the operation button 26, the touch panel 29, or the external key.

There is setting information in a so-called exclusive relationship in a plurality of setting items relating to the imaging conditions of the imaging unit. The main control unit 41 functions as an exclusive relationship definition unit that defines a combination of setting information prohibited from being simultaneously set by the main control unit 41 as an exclusive relationship for a first setting item and a second setting item included in a plurality of setting items relating to the imaging conditions. Specifically, the main control unit 41 reads an exclusive relationship setting table indicating the relationship between the setting information of the setting items as shown in FIG. 4 for the first setting item and the second setting item included in a plurality of setting items relating to the imaging conditions and determines whether to prohibit or permit simultaneous setting of the setting information based on the exclusive relationship setting table.

The example shown in FIG. 4 is an exclusive relationship setting table T1 indicating the relationship between setting information of ISO sensitivity and setting information of dynamic range setting described below. In the exclusive relationship setting table T1, the relationship between the setting information prohibited from being simultaneously set is indicated as "NG", and the relationship between the setting information permitted to be simultaneously set is indicated as "OK". The exclusive relationship setting table T1 is stored, for example, in the setting information storage unit 48 in a manufacturing stage.

In a case where the imaging condition setting rule and the setting information are set or changed by an operation of the operation button 26, the touch panel 29, or the external key, the main control unit 41 stores the imaging condition setting rule and the setting information in the setting information storage unit 48. The setting information storage unit 48 is constituted of a nonvolatile memory.

FIG. 5 shows an example of a setting menu that is displayed on the rear display unit 14. In a setting menu M, a plurality of setting items, such as an imaging condition setting rule, a focus mode, ISO sensitivity, dynamic range setting, and face detection, are displayed. The setting menu M is constituted of, for example, a plurality of pages, and a plurality of setting items are displayed on each page. In this case, it is possible to switch the pages of the setting menu M by the operation button 26 or the touch panel 29.

In a case where a user sets the imaging condition setting rule based on the setting menu M, the user operates the operation button 26 or the touch panel 29 to select a setting item of the imaging condition setting rule from a plurality of setting items. The operation button 26 or the touch panel 29 corresponds to a first operation unit in the claims.

In a case where the setting item of the imaging condition setting rule is selected, the operation button 26 or the touch panel 29 functions as a setting operation unit in the claims. Specifically, as shown in FIG. 6, a selection candidate list of the imaging condition setting rule including selection candidates, such as "ALL FIRST-WIN", "ALL LATE-WIN", and "MIXED", is displayed. The operation button 26 or the touch panel 29 is operated, whereby the imaging condition setting rule can be selectively set from "ALL FIRST-WIN", "ALL LATE-WIN", and "MIXED". A setting screen on which the selection candidate list shown in FIG. 6 is displayed corresponds to a selection menu in the claims.

As the imaging condition setting rule, the main control unit 41 enables selective setting of which of a first-win processing unit and a late-win processing unit described below is to be executed in a case where two setting items included in a plurality of setting items relating to the imaging conditions have an exclusive relationship based on the above-described exclusive relationship setting table. The main control unit 41 may function as a first-win processing unit or may function as a late-win processing unit depending on the imaging condition setting rule and a combination of two setting items relating to the imaging conditions.

In a case where the main control unit 41 functions as the first-win processing unit, the second setting item is prohibited from being set to second setting information in an exclusive relationship with first setting information after the first setting item is set to the first setting information. In a case where the main control unit 41 functions as the late-win processing unit, in a case where the second setting item is set to the second setting information in the exclusive relationship with the first setting information after the first setting item is set to the first setting information, the first setting information is changed to setting information not in the exclusive relationship.

In a case where "ALL FIRST-WIN" is selected from the selection candidate list shown in FIG. 6, an all first-win state in which the first-win processing unit is executed in all combinations of two setting items included in the plurality of setting items relating to the imaging conditions is brought. In a case where "ALL LATE-WIN" is selected, an all late-win state in which the late-win processing unit is executed in all combinations of two setting items included in a plurality of setting items relating to the imaging conditions is brought. Then, in a case where "MIXED" is selected, a mixed state in which, among all combinations of two setting items included in the plurality of setting items relating to the imaging conditions, a combination, in which the first-win processing unit is executed, and a combination, in which the late-win processing unit is executed, are mixed is brought.

In the embodiment, in a case where "MIXED" is selected as the imaging condition setting rule, a combination, in which the first-win processing unit is executed, and a combination, in which the late-win processing unit is executed, become combinations set in advance as an initial setting.

As the combinations set in advance as the initial setting, in the embodiment, in a case where there is the exclusive relationship based on the exclusive relationship setting table for a setting item, for which setting information can be set by the external key, and a setting item, for which setting information can be set by the operation button 26 or the touch panel 29 based on the setting menu, the setting item, for which the setting information can be set by the external key, is set to be given priority constantly. That is, the main control unit 41 executes the first-win processing unit and prohibits the second setting item to be set based on the setting menu from being set to the second setting information in the exclusive relationship with the first setting information after the first setting item is set to the first setting information by the external key. In a case where the second setting item to be set by the external key is set to the second setting information in the exclusive relationship with the first setting information after the first setting item to be set based on the setting menu is set to the first setting information, the main control unit 41 executes the late-win processing unit and changes the first setting information to the setting information not in the exclusive relationship with the second setting information.

In a case where the user sets the setting items relating to the imaging conditions based on the setting menu M, the user operates the operation button 26 or the touch panel 29 to select one setting item from a plurality of setting items. In this case, the operation button 26 or the touch panel 29 corresponds to a first operation unit in the claims. Among the setting items relating to the imaging conditions described below, there is a combination of setting information to be defined as the exclusive relationship by the main control unit 41, that is, a combination of setting information to be prohibited from being simultaneously set based on the exclusive relationship setting table. Then, in a case where there is the exclusive relationship based on the exclusive relationship setting table, as described above, the main control unit 41 executes the first-win processing unit or the late-win processing unit according to the imaging condition setting rule set by the operation button 26 or the touch panel 29 based on the setting menu M as described above.

In a case where a setting item of the focus mode is selected, as shown in FIG. 7, "AF-S", a selection candidate list of the focus mode including selection candidates, such as "AF-C" and "MF", is displayed. The operation button 26 or the touch panel 29 is operated, whereby setting of the focus mode is selected from the selection candidate list. Alternatively, the focus mode switch lever 27 is operated as described below, whereby the focus mode can be set.

In a case where "AF-S" (single AF) is selected from the selection candidate list, and in a case where the release switch 20 is half-depressed, focusing is performed on a subject within a focus area, and the focus is maintained as it is while the release switch 20 is half-depressed. In a case where "AF-C" (continuous AF) is selected, focusing is continued to the motion of the subject while the release switch 20 is half-depressed. In a case where "MF" (manual focus) is selected, focusing can be performed manually by a manual operation of the focus ring 17.

In a case where a setting item of the ISO sensitivity is selected, as shown in FIG. 8, a selection candidate list of the ISO sensitivity including "100", "200", "400", "640", "800", "1000", "1250", "1600", "2000", "2500", "3200", and the like is displayed. The operation button 26 or the touch panel 29 is operated, whereby setting information of the ISO sensitivity is selected from the selection candidate list. Alternatively, the ISO sensitivity dial 23 is operated as described below, whereby the ISO sensitivity can be set.

In a case where a setting item of the dynamic range setting is selected, as shown in FIG. 9, a selection candidate list of the dynamic range setting including "100", "200", "400", and the like is displayed. The operation button 26 or the touch panel 29 is operated, whereby setting information of the dynamic range setting is selected from the selection candidate list.

In a case where "100" is selected from the selection candidate list, imaging for acquiring an image of a standard dynamic range of the imaging element 34, that is, a dynamic range of 100% is performed. In a case where "200" is selected, imaging for acquiring an image of a dynamic range magnified to 200% of the standard dynamic range of the imaging element 34 is performed.

As a method of acquiring an image of a magnified dynamic range, for example, as described in JP2013-031205A or the like, dynamic range magnified image data having excellent reproducibility within a wide range from high brightness to low brightness is acquired by performing imaging under different exposure conditions, acquiring a plurality of pieces of image data different in amount of information per brightness including an image with a large amount of information on a high brightness side, an image with a large amount of information on a low brightness side, and the like, and composing a plurality of pieces of image data. In a case where "400" is selected, imaging for acquiring an image of a dynamic range magnified to 400% of the standard dynamic range of the imaging element 34 is performed.

In a case where a setting item of the face detection is selected, as shown in FIG. 10, a selection candidate list of the face detection including selection candidates, such as "ON" and "OFF", is displayed. In a case where "ON" is selected from the selection candidate list, a face of a person is detected, and focusing is performed with respect to the detected face. In a case where "OFF" is selected, the face detection is not performed.

A processing procedure for changing the imaging condition setting rule in the digital camera 11 is will be described along a flowchart shown in FIG. 11.

In the setting mode of the digital camera 11, the main control unit 41 reads the setting information of each setting item from the setting information storage unit 48 (S11). The main control unit 41 makes the rear display unit 14 display the setting screen of the setting menu M from the read setting information of each setting item (S12). In a case where the setting information of each setting item is not set, for example, the main control unit 41 may issue a warning for prompting a setting operation. With this, the setting information is set for the imaging condition setting rule and a plurality of setting items relating to the imaging conditions. Alternatively, the setting information may be initially set for all setting items at the time of factory shipment of the digital camera 11.

Next, in a case of setting or changing the imaging condition setting rule, as described above, the setting item of the imaging condition setting rule is selected from a plurality of setting items based on the setting menu M (in S13, Y). In a case where the imaging condition setting rule is set and is not changed (in S13, N), the setting items of the imaging conditions are set (S14).

In a case where the setting item of the imaging condition setting rule is selected (in S13, Y), and any one of "ALL FIRST-WIN", "ALL LATE-WIN", and "MIXED" is selected (S15), the imaging condition setting rule is stored in the setting information storage unit 48, and setting ends (S16).

Next, a processing procedure for changing the setting information relating to the imaging conditions in the digital camera 11 after "ALL FIRST-WIN" is set as the imaging condition setting rule will be described referring to a flowchart shown in FIG. 12 and an explanatory view shown in FIG. 13.

In the setting mode of the digital camera 11, the main control unit 41 reads the setting information of each setting item from the setting information storage unit 48 (S21). The main control unit 41 makes the rear display unit 14 display the setting screen of the setting menu M from the read setting information of each setting item (S22). In an example shown in FIG. 13, the setting items other than the setting item of the imaging condition setting rule are set to, for example, initial setting at the time of factory shipment. In the embodiment, as the initial setting, setting information to be permitted to be simultaneously set for each setting item is set in advance based on the exclusive relationship setting table.

Then, the setting information of the first setting item is set (S23). The example shown in FIG. 13 shows a state in which the ISO sensitivity is selected as the first setting item (display surrounded by a double frame line). Then, in a case where the setting item of the ISO sensitivity is set to the first setting information based on the selection candidate list shown in FIG. 8 by the operation button 26 or the touch panel 29 or by an operation of the ISO sensitivity dial 23 (in S23, Y), the main control unit 41 determines whether or not there is the second setting information of the dynamic range setting (second setting item) in the exclusive relationship with the first setting information of the ISO sensitivity based on the exclusive relationship setting table T1 (S24). In a case where the setting information of the ISO sensitivity is not set (in S23, N), the display of the setting menu M is returned (S22).

Figure 13:
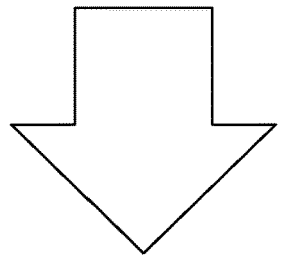
FIG. 13 is an explanatory view of a setting screen on which a first-win processing unit is executed to prohibit setting information of the dynamic range setting and setting information of the ISO sensitivity from being set to setting information in an exclusive relationship.

In the example shown in FIG. 13, "100" is selected the first setting information of the ISO sensitivity. For this reason, since "200" and "400" of the dynamic range setting are in the exclusive relationship based on the exclusive relationship setting table T1, the main control unit 41 determines that there is the second setting information in the exclusive relationship.

In a case where there is the second setting information of the dynamic range setting in the exclusive relationship with the first setting information of the ISO sensitivity (in S24, Y), the main control unit 41 executes the first-win processing unit and sets the dynamic range setting to setting information not in the exclusive relationship with the first setting information of the ISO sensitivity (S25). The main control unit 41 prohibits the dynamic range setting from being set to the second setting information in the exclusive relationship (S26).

In the example shown in FIG. 13, the dynamic range setting is set to "100" as setting information not in the exclusive relationship with the ISO sensitivity "100" based on the exclusive relationship setting table T1. In a case where the setting information of the dynamic range setting is changed to the setting information not in the exclusive relationship with the setting information of the ISO sensitivity, the main control unit 41 makes the setting item and the setting information of the dynamic range setting displayed in the setting menu M be displayed in a special display form (a meshed portion), and prohibits the dynamic range setting from being set to "200" and "400" in the exclusive relationship. As the state of prohibiting setting of the second setting information in the exclusive relationship with the first setting information in S26, for example, the setting information of the dynamic range setting is fixed to "100", even though the dynamic range setting is about to be selected from the setting menu M, the selection candidate list is not displayed, and the setting information of the dynamic range setting cannot be changed.

The main control unit 41 stores the first setting information of the ISO sensitivity and the second setting information of the dynamic range setting after setting in the setting information storage unit 48 (S27). In a case where there is no second setting information of the dynamic range setting in the exclusive relationship with the first setting information of the ISO sensitivity (in S24, N), the main control unit 41 does not set the dynamic range setting and stores only the first setting information of the ISO sensitivity after setting in the setting information storage unit 48 (S28).

As described above, in a case where "ALL FIRST-WIN" is selected as the imaging condition setting rule, the main control unit 41 constantly executes the first-win processing unit, and even in a case where the setting item other than the above-described ISO sensitivity is selected as the first setting item, the main control unit 41 executes the first-win processing unit similarly.

Next, a processing procedure for changing the setting information relating to the imaging conditions in the digital camera 11 after "ALL LATE-WIN" is set as the imaging condition setting rule will be described referring to a flowchart shown in FIG. 14 and an explanatory view shown in FIG. 15.

In the setting mode of the digital camera 11, the main control unit 41 reads the setting information of each setting item from the setting information storage unit 48 (S31). The main control unit 41 makes the rear display unit 14 display the setting screen of the setting menu M from the read setting information of each setting item (S32). An example shown in FIG. 15 shows a state in which, among the setting items other than the setting item of the imaging condition setting rule, the ISO sensitivity as the first setting item is set, and then, the dynamic range setting as the second setting item is set, and other setting items are set to the initial setting.

Next, the first setting information of the first setting item is set (S33). As described above, the setting item of the ISO sensitivity is set to the first setting information is set based on the selection candidate list by the operation button 26 or the touch panel 29 or by an operation of the ISO sensitivity dial 23. The example shown in FIG. 15 shows a state in which the setting information of the ISO sensitivity is set to "100". The main control unit 41 stores the first setting information of the ISO sensitivity after setting in the setting information storage unit 48 (S34).

After the ISO sensitivity is set to the first setting information and is stored in the setting information storage unit 48, in a case where the second setting information of the second setting item is set (in S35, Y), the main control unit 41 determines whether or not the second setting item is set to the second setting information in the exclusive relationship with the first setting information based on the exclusive relationship setting table (S36).

Figure 15:
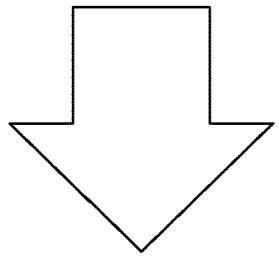
FIG. 15 is an explanatory view showing an example of a setting screen in a case where a late-win processing unit is executed to change the setting information of the ISO sensitivity to setting information not in the exclusive relationship with the setting information of the dynamic range setting.

In the example shown in FIG. 15, "100" is set as the first setting information of the ISO sensitivity, and then, "400" is set as the second setting information of the dynamic range setting. For this reason, the main control unit 41 determines that the second setting item is set to the second setting information in the exclusive relationship based on the exclusive relationship setting table T1.

In a case where the dynamic range setting is set to the second setting information in the exclusive relationship with the first setting information of the ISO sensitivity (in S36, Y), the main control unit 41 executes the late-win processing unit and changes the first setting information of the ISO sensitivity to setting information not in the exclusive relationship with the second setting information of the dynamic range setting (S37).

In the example shown in FIG. 15, as the setting information not in the exclusive relationship with the dynamic range setting "400", the ISO sensitivity is changed from "100" to "800" based on the exclusive relationship setting table T1. As the setting information of the ISO sensitivity, although there are a plurality of pieces of setting information not in the exclusive relationship with the dynamic range setting "400" in addition to "800", in the example shown in FIG. 15, "800" closest to "100" before change is selected.

In a case where the ISO sensitivity is set by the ISO sensitivity dial 23 as the external key, the late-win processing unit is executed to change the first setting information to the setting information not in the exclusive relationship with the second setting information, and the setting information based on the positional information of the ISO sensitivity dial 23 may be different from the first setting information after change. In this case, the main control unit 41 functions as a warning unit that issues a warning that the first setting information is changed. In a case where the main control unit 41 functions as the warning unit, for example, as shown in FIG. 15, an information change portion indicating information that the ISO sensitivity is changed from "100" to "800" is displayed in the setting menu M.

The main control unit 41 stores the first setting information of the ISO sensitivity after setting and the second setting information of the dynamic range setting after change in the setting information storage unit 48 (S38). In a case where the dynamic range setting is not set to the second setting information in the exclusive relationship with the first setting information of the ISO sensitivity (in S36, N), the main control unit 41 does not change the ISO sensitivity and stores only the second setting information of the ISO sensitivity after setting in the setting information storage unit 48 (S39).

As described above, in a case where "ALL LATE-WIN" is selected as the imaging condition setting rule, the main control unit 41 constantly executes the late-win processing unit, and even in a case where the setting item other than the above-described dynamic range setting is selected as the second setting item, the main control unit 41 executes the late-win processing unit similarly. Even after the setting items relating to all imaging conditions are set, the main control unit 41 executes the late-win processing unit similarly.

Next, a processing procedure for changing the setting information relating to the imaging conditions in the digital camera 11 after "MIXED" is set as the imaging condition setting rule will be described referring to a flowchart shown in FIG. 16 and an explanatory view shown in FIG. 17. In the flowchart shown in FIG. 16, although the processing for storing the setting information in the setting information storage unit 48 is omitted, in actual processing, as in the flowcharts of FIGS. 12 and 14, in a case where the setting information of the setting item is set or changed, the setting information is stored in the setting information storage unit 48.

In the setting mode of the digital camera 11, the main control unit 41 reads the setting information of each setting item from the setting information storage unit 48 (S41). The main control unit 41 makes the rear display unit 14 display the setting screen of the setting menu M from the read setting information of each setting item (S42). An example shown in FIG. 17 shows a state in which, among the setting items other than the setting item of the imaging condition setting rule, for example, the ISO sensitivity as the first setting item and the dynamic range setting as the second setting item are set from a state of the initial setting.

Next, the first setting information of the first setting item is set (S43). The example shown in FIG. 17 shows a state in which the setting information of the ISO sensitivity is set to "100" by an operation of the ISO sensitivity dial 23.

After the first setting item is set to the first setting information and is stored in the setting information storage unit 48, the main control unit 41 determines whether or not the first setting item is set by the external key (S44). As described above, in a case where the ISO sensitivity is set to the first setting information by the ISO sensitivity dial 23 as the external key (in S44, Y), the main control unit 41 executes the first-win processing unit, sets the setting information of the dynamic range setting to setting information not in the exclusive relationship with the first setting information of the ISO sensitivity, and prohibits the dynamic range setting from being set to the second setting information in the exclusive relationship (S45).

Figure 12:
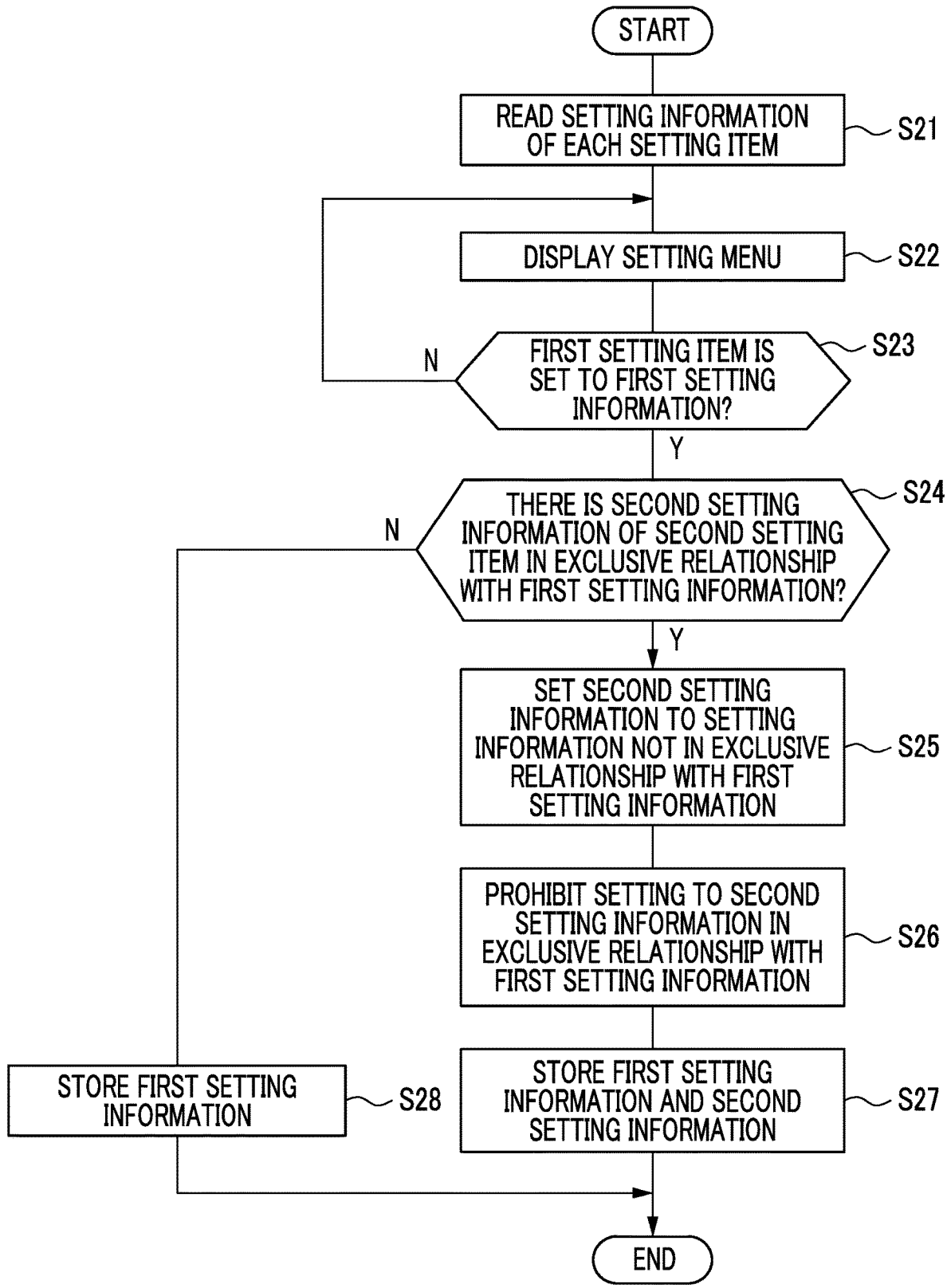
FIG. 12 is a flowchart illustrating processing in changing setting information relating to imaging conditions after "ALL FIRST-WIN" is set.

Although the state of prohibiting setting of the second setting information in the exclusive relationship with the first setting information in S46 is the same as the processing of S26 described referring to the flowchart shown in FIG. 12 described above, in a case where the main control unit 41 is executed as the late-win processing unit after the processing of S46, the prohibition is cancelled and the setting information is permitted to be changed to the second setting information in the exclusive relationship with the first setting information.

After the first setting item is set to the first setting information based on the setting menu M by the operation button 26 or the touch panel 29 instead of the external key (in S44, N), in a case where the second setting information of the second setting item is set (in S46, Y), the main control unit 41 determines whether or not the second setting item is set by the external key (S47). In a case where the second setting item is set to the second setting information by the external key (in S47, Y), the main control unit 41 determines whether or not the second setting item is set to the second setting information in the exclusive relationship with the first setting information based on the exclusive relationship setting table (S48).

In a case where the dynamic range setting is set to the second setting information in the exclusive relationship with the first setting information of the ISO sensitivity (in S48, Y), the main control unit 41 executes the late-win processing unit and changes the first setting information of the ISO sensitivity to setting information not in the exclusive relationship with the second setting information of the dynamic range setting (S49). The processing of S48 and S49 are the same as the processing of S36 and S49 described referring to the flowchart shown in FIG. 14 described above.

Figure 11:
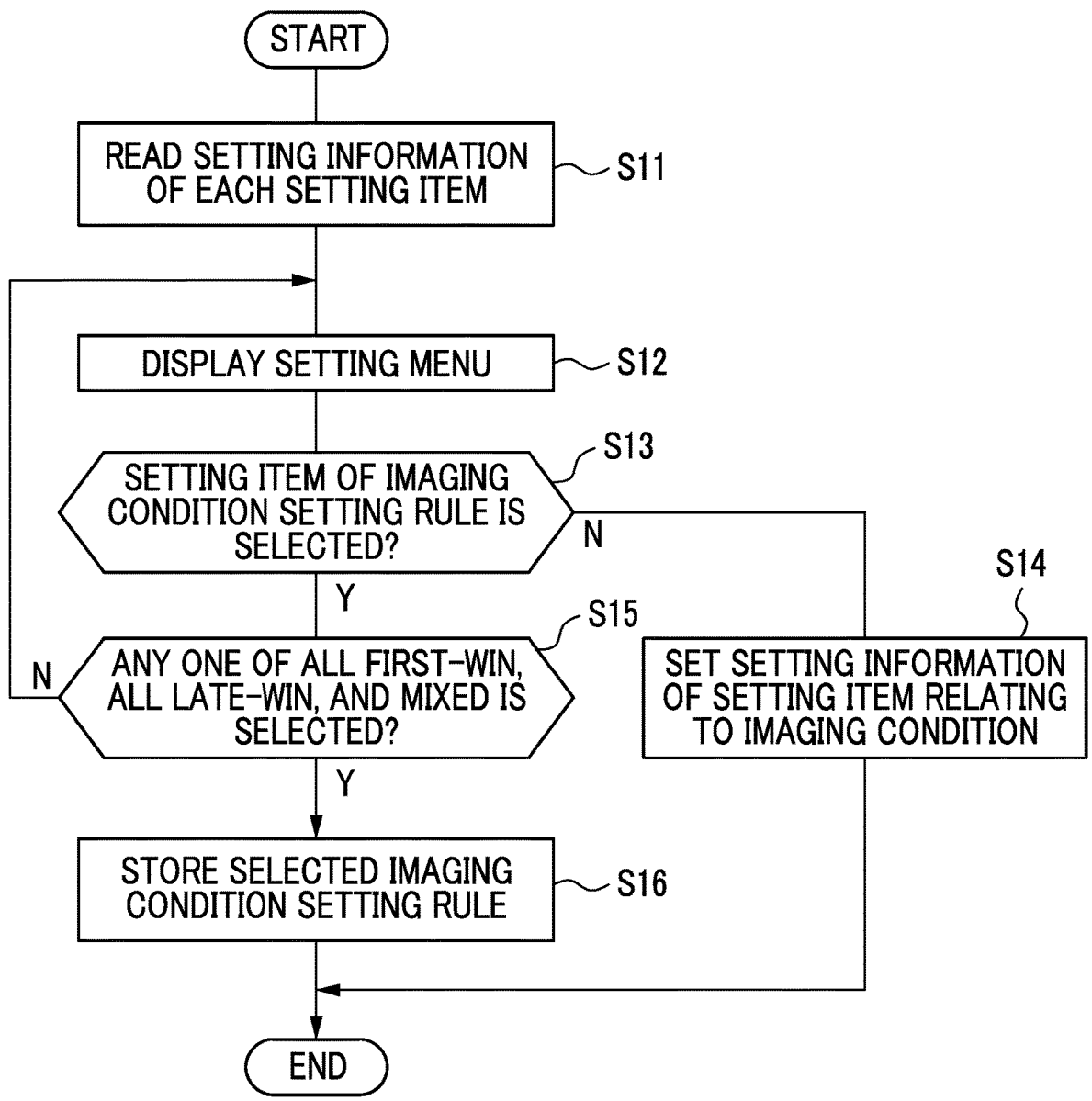
FIG. 11 is a flowchart illustrating processing in changing setting information of the imaging condition setting rule.
Figure 14:
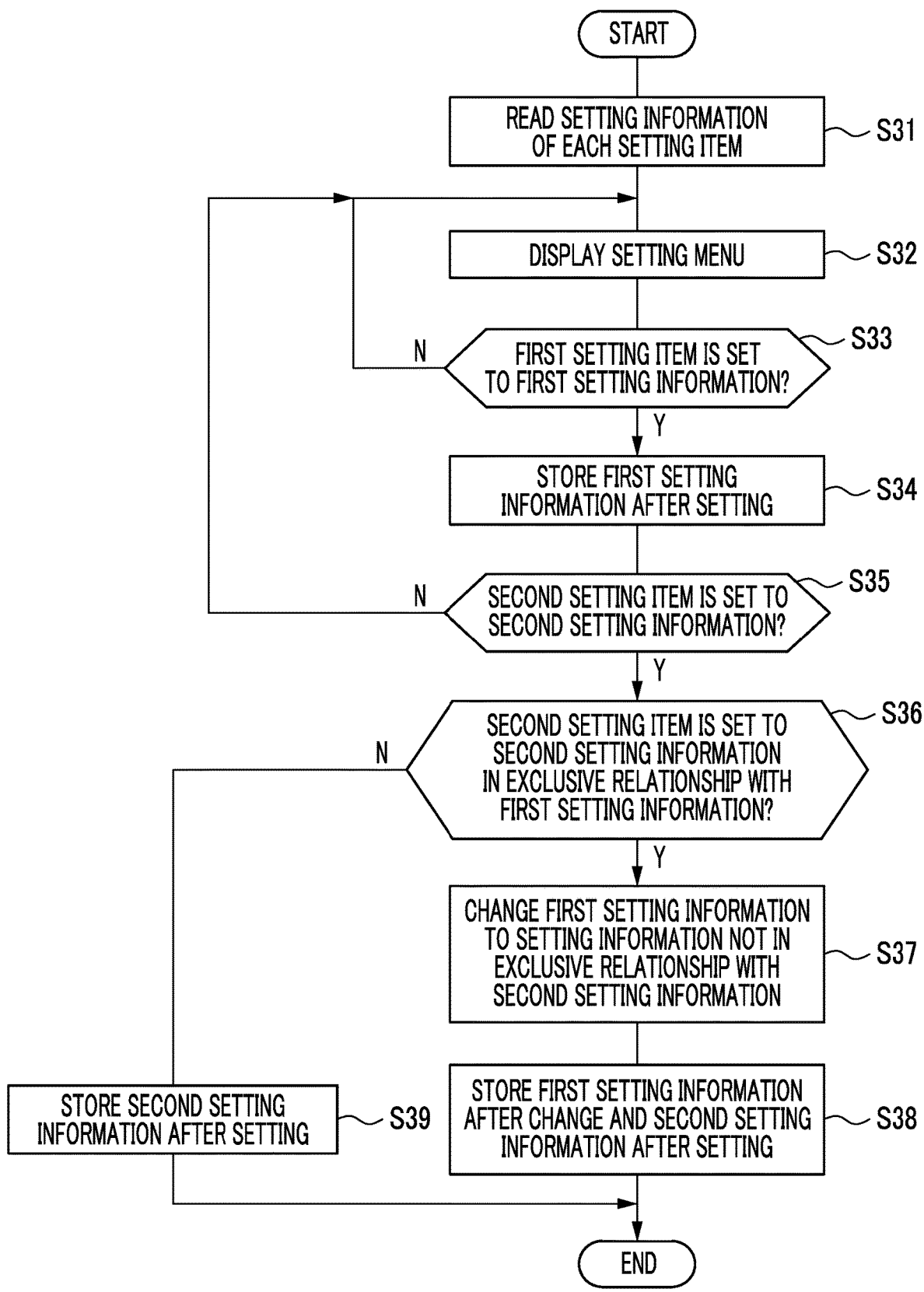
FIG. 14 is a flowchart illustrating processing in changing the setting information relating to the imaging conditions after "ALL LATE-WIN" is set.
Figure 16:
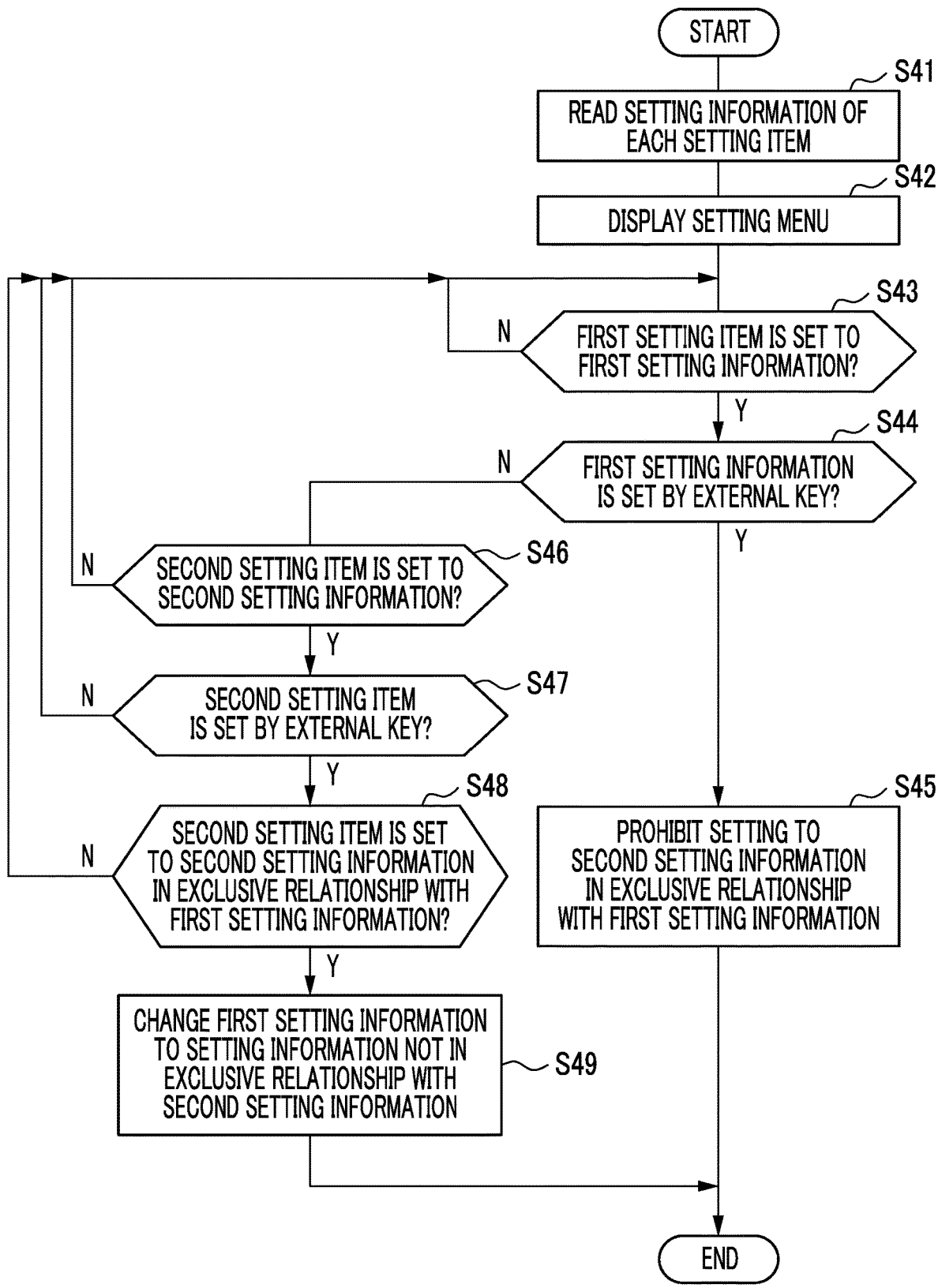
FIG. 16 is a flowchart illustrating processing in changing the setting information relating to the imaging conditions after "MIXED" is set.

A series of steps of setting the imaging condition setting rule shown in FIG. 11 and a series of steps of changing the setting information relating to the imaging conditions shown in FIGS. 12, 14, and 16 are stored in a storage unit of the main control unit 41 as a control program that is executable by the main control unit 41.

As described above, in a case where "MIXED" is selected as the imaging condition setting rule, the main control unit 41 executes the first-win processing unit or the late-win processing unit according to a combination set in advance. In the example shown in the flowchart of FIG. 16, although the first-win processing unit or the late-win processing unit is set to be executed in a case where the setting item is set by the external key, the invention is not limited thereto, and even in a case where the setting item as the setting item, for which the setting information can be set by the external key, is set based on the setting menu M by the operation button 26 or the touch panel 29, similarly, the first-win processing unit or the late-win processing unit may be set to be executed.

In the digital camera 11 of the embodiment, since selective setting of which of the first-win processing unit and the late-win processing unit is to be executed for a plurality of setting items in the exclusive relationship is enabled, it is possible to properly use the first-win processing and the late-win processing according to the preference of the user.

Since one imaging condition setting rule can be selected from the selection candidate list including "ALL FIRST-WIN", "ALL LATE-WIN", and "MIXED", it is possible to simply set the first-win processing and the late-win processing. In a case of setting the imaging condition setting rule, the setting menu M is displayed on the rear display unit, and the operation button 26 or the touch panel 29 is operated, whereby it is possible to select any one of "ALL FIRST-WIN", "ALL LATE-WIN", and "MIXED". For this reason, it is possible to more simply perform setting.

Second Embodiment

In the above-described first embodiment, although an example where, in a case where "MIXED" is selected as the imaging condition setting rule, the main control unit 41 executes the first-win processing unit or the late-win processing unit according to a combination set in advance, the invention is not limited thereto. In a second embodiment described below, in a case where "MIXED" is selected as the imaging condition setting rule, priority is decided for a plurality of setting items relating to the imaging conditions, and the first-win processing unit or the late-win processing unit is executed based on the decided priority.

In a case where "MIXED" is selected as the imaging condition setting rule based on the setting menu M, a priority decision screen shown in FIG. 18 is displayed. On the priority decision screen, the setting items relating to the imaging condition are arranged in a descending order of priority. In the setting mode, in a case where the priority decision screen is displayed, the main control unit 41 functions as a priority decision unit, and can change priority by moving a position of a setting item through a touch operation on upward and downward arrows displayed in the same column as the setting item relating to the imaging condition.

In a case where "MIXED" is selected as the imaging condition setting rule, the main control unit 41 compares the priority of the first setting item with the priority of the second setting item, and in a case where the priority of the second setting item is lower than the priority of the first setting item, executes the first-win processing unit. That is, the main control unit 41 prohibits the second setting item with priority lower than the first setting item from being set to setting information in the exclusive relationship with the first setting information after the first setting item is set to the first setting information. The main control unit 41 executes the late-win processing unit in a case where the priority of the second setting item is higher than the priority of the first setting item. That is, main control unit 41 changes the first setting information to setting information not in the exclusive relationship with the second setting information in a case where the second setting item with priority higher than the first setting item is set to the second setting information in the exclusive relationship after the first setting item is set to the first setting information.

Third Embodiment

In the above-described first embodiment, although a combination of the setting information of the ISO sensitivity and the setting information of the dynamic range setting is exemplified as a combination of the setting information in the exclusive relationship, the invention is not limited thereto. In a third embodiment described below, a combination of the setting information of the focus mode and the setting information of the face detection is exemplified. That is, there is the setting information of the face detection in the exclusive relationship with the setting information of the focus mode.

Specifically, in a case where "MF" is selected as the setting information of the focus mode, in the face detection, only "OFF" can be set as the setting information simultaneously with "MF", and "ON" is prohibited from being set simultaneously with "MF". As shown in FIG. 19, the setting information of the focus mode can be set by the focus mode switch lever 27 as the external key.

In the setting mode, in a case where the focus mode is set to "MF" by the focus mode switch lever 27 as the external key, as in the above-described first embodiment, the main control unit 41 executes the first-win processing unit or the late-win processing unit, sets the setting information of the face detection to "OFF", and prohibits the face detection from being set to "ON" in the exclusive relationship.

As the combination of the setting information in the exclusive relationship, in addition to the above-described example, for example, there is a combination of setting information of an imaging mode and setting information of flash setting. Specifically, in a case where "CONTINUOUS IMAGING" is selected as the setting information of the imaging mode, in the flash setting, only "OFF" can be set as the setting information simultaneously with "CONTINUOUS IMAGING", and "ON" is prohibited from being set simultaneously with "CONTINUOUS IMAGING". This is because, in a case of continuous imaging, an electric charge accumulation time for one frame by the imaging element 34 is short and the flash device 24 does not emit flash light in time, that is, flash imaging cannot be performed.

As the combination of the setting information in the exclusive relationship, there is a combination of setting information of a shutter system and setting information of a continuous shooting speed. Specifically, in a case where "MS" is selected as the setting information of the shutter system from selection candidates, such as "MS (mechanical shutter)" and "ES (electronic shutter)", in the continuous shooting speed, a low continuous shooting speed can be set and selected as the setting information simultaneously with "MS", and a high continuous shooting speed is prohibited from being set simultaneously with {MS}.

In the respective embodiments described above, the imaging element 34 is a CMOS image sensor, but may be a CCD image sensor. In the respective embodiments described above, the finder unit is an electronic view finder, but may be a hybrid view finder. In the respective embodiments described above, although the internal flash device is used, an external flash device may be used.

The invention can be applied to an imaging apparatus, such as a smartphone or a video camera, in addition to the digital camera.

EXPLANATION OF REFERENCES

11: digital camera
12: camera body
13: lens barrel
14: rear display unit
15: finder unit
15A: finder objective window
16: imaging optical system
17: focus ring
18: stop ring
19: power lever
20: release switch
21: exposure correction dial
22: shutter speed dial
23: ISO sensitivity dial
24: flash device
26: operation button
27: focus mode switch lever
28: in-finder display unit
29: touch panel
31: focus lens
32: stop unit
32a: stop leaf blade
33: shutter unit
34: imaging element
36, 37, 38: motor
39: motor driver
41: main control unit
42: bus
44: memory control unit
45: digital signal processing unit
46: medium control unit
47: display control unit
48: setting information storage unit
49: memory
51: recording medium

What is claimed is:

1. An imaging apparatus comprising:
an imager that captures a subject image;
a processor configured to:
  setting one piece of setting information of a plurality of pieces of setting information in the imager for each of a plurality of setting items relating to imaging conditions of the imager;
  defining a combination of setting information prohibited from being simultaneously set as an exclusive relationship for a first setting item and a second setting item included in the plurality of setting items;
  performing a first-win processing that prohibits the second setting item from being set to second setting information in the exclusive relationship after the first setting item is set to first setting information;
  performing a late-win processing that changes the first setting information to setting information not in the exclusive relationship in a case where the second setting item is set to the second setting information in the exclusive relationship after the first setting item is set to the first setting information; and
a setting operation member that enables selective setting of which of the first-win processing and the late-win processing is to be executed for a relationship between two setting items included in the plurality of setting items.

2. The imaging apparatus according to claim 1,
wherein the setting operation member enables selective setting of
an all first-win state in which the processor is executed to perform first-win processing in all combinations of two setting items included in the plurality of setting items,
an all late-win state in which the processor is executed to perform late-win processing in all combinations of two setting items included in the plurality of setting items, and a mixed state in which, among all combinations of two setting items included in the plurality of setting items, a combination, in which the processor is executed to perform first-win processing, and a combination, in which the processor is executed to perform late-win processing, are mixed.

3. The imaging apparatus according to claim 2, further comprising:

a display that displays a setting menu for enabling setting of setting information of any one of the first setting item and the second setting item, wherein the setting operation member includes a first operation member that enables setting of the setting information of any one of the first setting item and the second setting item in a case where the setting menu is displayed on the display.

4. The imaging apparatus according to claim 3, wherein the setting operation member includes a second operation member different from the first operation member, and in a case where a setting item, for which setting information is set by the second operation member, and a setting item, for which setting information is set by the first operation member, have the exclusive relationship defined by the processor, and the mixed state is set by the setting operation member, the processor prohibits the second setting item from being set to the second setting information in the exclusive relationship by the first operation member after the first setting item is set to the first setting information by the second operation member, and the processor changes the first setting information to the setting information not in the exclusive relationship in a case where the second setting item is set to the second setting information in the exclusive relationship by the second operation member after the first setting item is set to the first setting information by the first operation member.

5. The imaging apparatus according to claim 4, wherein the second operation member comprises an operator that is provided in an apparatus body, and a detector that detects positional information of the operator, and sets setting information based on the positional information of the operator detected by the detector.

6. The imaging apparatus according to claim 5, wherein the processor, in a case where the first setting information is changed to the setting information not in the exclusive relationship with the second setting information by the late-win processing, and the setting information based on the positional information of the operator is different from the first setting information, issues a warning that the setting information is changed.

7. The imaging apparatus according to claim 3, wherein the setting menu includes a selection menu for selecting the all first-win state, the all late-win state, and the mixed state, and the setting operation member enables setting of any one of the all first-win state, the all late-win state, and the mixed state in a case where the selection menu is displayed on the display.

8. The imaging apparatus according to claim 2, wherein the processor decides priority for the plurality of setting items in a case where the mixed state is selected by the setting operation member, prohibits the second setting item with priority lower than the first setting item from being set to setting information in the exclusive relationship after the first setting item is set to the first setting information, and changes the first setting information to the setting information not in the exclusive relationship in a case where the second setting item with priority higher than the first setting item is set to the second setting information in the exclusive relationship after the first setting item is set to the first setting information.

9. A control method for an imaging apparatus comprising:

a step of defining a combination of setting information prohibited from being simultaneously set as an exclusive relationship for a first setting item and a second setting item included in a plurality of setting items relating to imaging condition of an imager;

a step of selectively setting execution of first-win processing or late-win processing for the relationship between two setting items included in the plurality of setting items;

a step of prohibiting the second setting item from being set to second setting information in the exclusive relationship after the first setting item is set to first setting information in a case where the first-win processing is set for the relationship between two setting items included in the plurality of setting items; and a step of changing the first setting information to setting information not in the exclusive relationship in a case where the late-win processing is set for the relationship between two setting items included in the plurality of setting items, and in a case where the second setting item is set to the second setting information in the exclusive relationship after the first setting item is set to the first setting information.

10. A non-transitory computer readable medium for storing a computer-executable program for controlling an imaging apparatus, the computer-executable program causing the computer to execute:

a function of defining a combination of setting information prohibited from being simultaneously set as an exclusive relationship for a first setting item and a second setting item included in a plurality of setting items relating to imaging condition of an imager;

a function of selectively setting execution of first-win processing or late-win processing for the relationship between two setting items included in the plurality of setting items;

a function of prohibiting the second setting item from being set to second setting information in the exclusive relationship after the first setting item is set to first setting information in a case where the first-win processing is set for the relationship between two setting items included in the plurality of setting items; and a function of changing the first setting information to setting information not in the exclusive relationship in a case where the late-win processing is set for the relationship between two setting items included in the plurality of setting items, and in a case where the second setting item is set to the second setting information in the exclusive relationship after the first setting item is set to the first setting information.

* * * * *